US008248667B2

(12) United States Patent
Mori

(10) Patent No.: US 8,248,667 B2
(45) Date of Patent: Aug. 21, 2012

(54) DOCUMENT MANAGEMENT DEVICE, DOCUMENT MANAGEMENT METHOD, AND COMPUTER PROGRAM PRODUCT

(75) Inventor: Shinya Mori, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 811 days.

(21) Appl. No.: 12/314,832

(22) Filed: Dec. 17, 2008

(65) Prior Publication Data

US 2009/0161152 A1  Jun. 25, 2009

(30) Foreign Application Priority Data

Dec. 21, 2007 (JP) ................. 2007-330027

(51) Int. Cl.
*H04N 1/04* (2006.01)
(52) U.S. Cl. ........ 358/403; 358/505; 358/474; 358/1.15
(58) Field of Classification Search .................. 358/403, 358/505, 474, 1.15, 1.16, 1.18
See application file for complete search history.

(56) References Cited

U.S. PATENT DOCUMENTS

| 7,590,622 | B2 * | 9/2009 | Silverbrook et al. | ................. | 1/1 |
| 7,826,101 | B2 * | 11/2010 | Yano et al. | .................... | 358/403 |
| 2004/0083432 | A1 | 4/2004 | Kawamura et al. | | |

FOREIGN PATENT DOCUMENTS

| JP | 10-269237 | 10/1998 |
| JP | 2003-196439 | 7/2003 |
| JP | 2004-145569 | 5/2004 |
| JP | 2006-065874 | 3/2006 |
| JP | 2006-195704 | * 7/2006 |

OTHER PUBLICATIONS

Japanese Office Action dated May 15, 2012, issued in corresponding Japanese Patent Application No. 2007-330027.

* cited by examiner

*Primary Examiner* — Houshang Safaipour
(74) *Attorney, Agent, or Firm* — Harness, Dickey & Pierce, P.L.C.

(57) ABSTRACT

An operating unit selects a piece of document data from among a plurality of pieces of document data from a document database. A relationship-information searching unit searches a relationship information database that stores relationship information in the form of parent-child relationship between the pieces of document data, for the relationship information pertaining to the selected piece of document data. A related-document-list creating unit creates from the retrieved relationship information, a list that indicates a hierarchical relationship between the selected piece of document data and other pieces of document data. A display unit displays the pieces of document data related to the selected piece of document data on a single screen based on the list.

15 Claims, 9 Drawing Sheets

FIG. 2

| DOCUMENT ID | DOCUMENT DATA |
|---|---|
| B01 | DATA1 |
| B02 | DATA2 |
| B03 | DATA3 |
| ⋮ | ⋮ |

FIG. 3

| RELATIONSHIP INFORMATION ID | PARENT DOCUMENT ID | CHILD DOCUMENT ID |
|---|---|---|
| K01 | B01 | B02 |
| K02 | B02 | B03 |
| K03 | B02 | B04 |
| ⋮ | ⋮ | ⋮ |

| NAME | NO. OF SECTIONS | SIZE | DOCUMENT STATUS | DATE CREATED | DATE MODIFIED | DOCUMENT TYPE |
|---|---|---|---|---|---|---|
| ☐ QUOTATION | × | × | × | ××× | ××× | ××× |
| ☐ PURCHASE ORDER | × | × | × | ××× | ××× | ××× |
| ☐ INVOICE | × | × | × | ××× | ××× | ××× |
| ☐ DRAWINGS | × | × | × | ××× | ××× | ××× |
| ☐ CONSTRUCTION PHOTOGRAPHS | × | × | × | ××× | ××× | ××× |

DOCUMENT MANAGEMENT DEVICE, DOCUMENT MANAGEMENT METHOD, AND COMPUTER PROGRAM PRODUCT

CROSS-REFERENCE TO RELATED APPLICATIONS

The present application claims priority to and incorporates by reference the entire contents of Japanese priority document 2007-330027 filed in Japan on Dec. 21, 2007.

BACKGROUND OF THE INVENTION

1. Field of the Invention

The present invention relates to a document management device, a document management method, and a computer program product.

2. Description of the Related Art

To search related documents on a network, there is known a method of accessing a search server and typing a keyword to have a search result displayed. The search result is typically in the form of links to the related documents. Thus, a particular related document listed in the search result can be accessed by clicking a link of that document. However, in this method, each document in the search result is displayed independently of the other documents, making it difficult for a user to check connection of one document with other documents.

A document viewing system disclosed in Japanese Patent Application Laid-open No. H10-269237 gives a solution to this problem. In this document viewing system, when a user selects a document for viewing, the selected document is displayed along with other documents that are related to the selected document. Thus, the user can view, along with a desired document, other documents that are related to the desired document. This document viewing system, however, cannot display documents that are related to the related documents of the document selected by the user.

SUMMARY OF THE INVENTION

It is an object of the present invention to at least partially solve the problems in the conventional technology.

According to an aspect of the present invention, there is provided a document management device including a document storage unit that stores therein pieces of document data; a relationship-information storage unit that stores therein relationship information indicating a parent-child relationship between the pieces of document data stored in the document storage unit; a document selecting unit that selects a piece of document data from among the pieces of document data stored in the document storage unit as a selected piece of document data; a searching unit that searches the relationship-information storage unit for related-document information that is relationship information pertaining to the selected piece of document data; a creating unit that creates from the related-document information retrieved by the searching unit a list that indicates a hierarchical relationship between the selected piece of document data and other pieces of document data stored in the document storage unit; and a related-document display unit that displays the pieces of document data that are related to the selected piece of document data on a single screen based on the list.

According to another aspect of the present invention, there is provided a document management method including providing a document storage unit that stores therein pieces of document data; providing a relationship-information storage unit that stores therein relationship information indicating a parent-child relationship between the pieces of document data stored in the document storage unit; selecting a piece of document data from among the pieces of document data stored in the document storage unit as a selected piece of document data; searching the relationship-information storage unit for related-document information that is relationship information pertaining to the selected piece of document data; creating from the related-document information retrieved at the searching a list that indicates a hierarchical relationship between the selected piece of document data and other pieces of document data stored in the document storage unit; and displaying the pieces of document data that are related to the selected piece of document data on a single screen based on the list.

According to still another aspect of the present invention, there is provided a computer program product including a computer-readable storage medium having stored thereon a document management program that implements the above document management method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a tabular representation of the contents of a document database (DB) shown in FIG. 1;

FIG. 3 is a tabular representation of a relationship information database shown in FIG. 1;

DETAILED DESCRIPTION OF THE PREFERRED EMBODIMENTS

Exemplary embodiments according to the present invention are explained below with reference to the accompanying drawings. The present invention is not limited to the embodiments described here.

A first embodiment of the present invention is explained first. A document management device according to the first embodiment is adapted to a personal computer (PC). The document management device according to the first embodiment can also be adapted to a server device, a multi-function peripheral (MFP), a printer device, a copying device, a facsimile device, etc.

Figure 1:
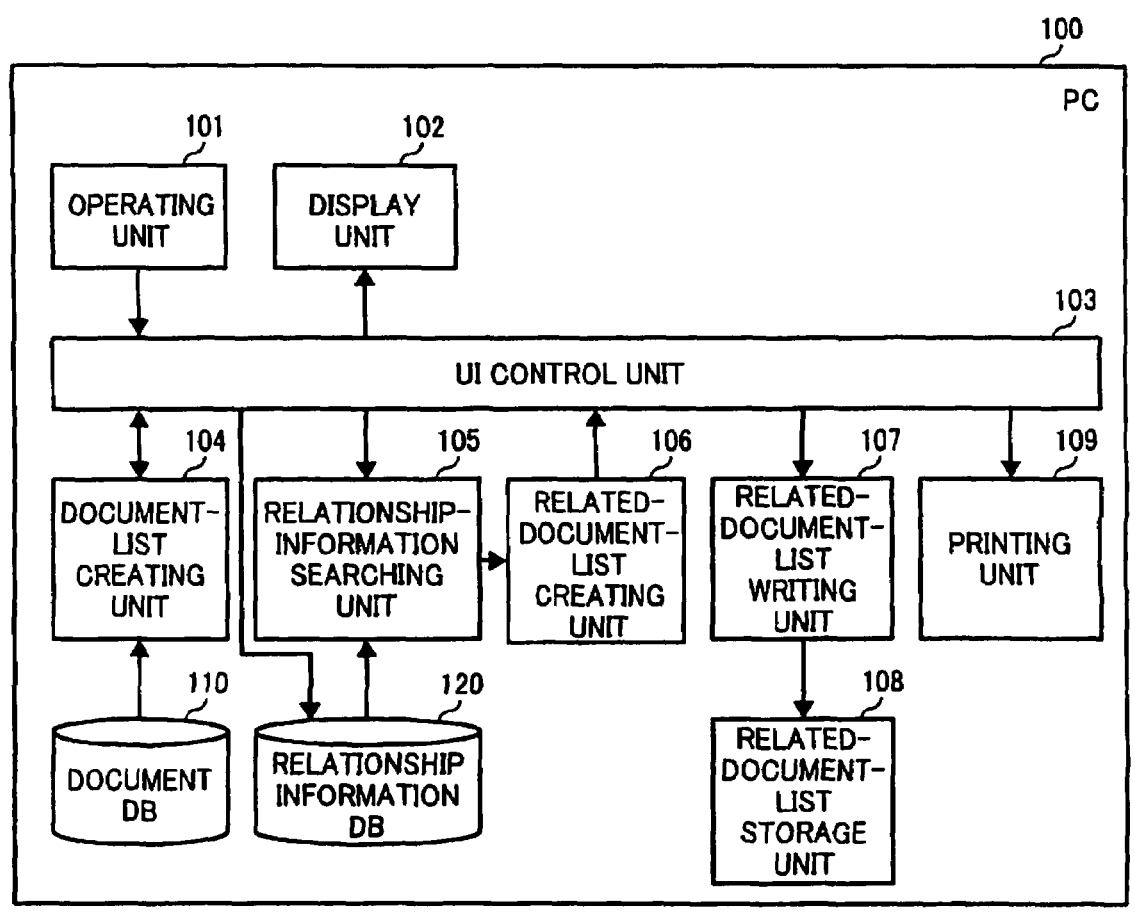
FIG. 1 is a block diagram of a personal computer (PC) according to a first embodiment of the present invention.

A configuration of a PC 100 according to the first embodiment is explained below. FIG. 1 is a block diagram of the PC 100 according to the first embodiment. The PC 100 includes an operating unit 101, a display unit 102, a user-interface (UI) control unit 103, a document-list creating unit 104, a relationship-information searching unit 105, a related-document-list creating unit 106, a related-document-list writing unit 107, a related-document-list storage unit 108, a printing unit 109, a document database (DB) 110, and a relationship information database 120.

The document database 110 contains document data. FIG. 2 is a tabular representation of the contents of the document database 110. The document database 110 contains the fields 'Document ID' and 'Document data' in an associated manner. The field 'Document ID' stores identifiers distinguishing the pieces of document data such as B01, B01, B03. The field 'Document data' stores Portable Document Format (PDF) data and also includes document names such as DATA1, DATA2, DATA3. The document data can contain image data, text data, etc., or a combination thereof.

The relationship information database 120 contains parent-child relationship of the document data. FIG. 3 is a tabular representation of the contents of the relationship information database 120. The relationship information database 120 contains the fields 'Relationship information ID', 'Parent document ID', and 'Child document ID' in an associated manner. The field 'Relationship information ID' stores identifiers for distinguishing pieces of relationship information such as K01, K02, K03. The field 'Parent document ID' stores identifiers of the document data, which is parent information (that is, super-level information) relative to the document data corresponding to the child document ID such as B01, B01, B03. The field 'Child document ID' stores identifiers of the document data, which is child information (that is, sub-level information) relative to the document data corresponding to the parent document ID such as B02, B03, B04.

In the example shown in FIG. 3, it can be understood from relationship information K01 that parent document B01 is related to child document B02. Moreover, it can be understood from relationship information K02 that parent document B02 is related to child document B03. In other words, the documents B01, B02, and B03 share a parent-child-grandchild relationship. It can further be understood from relationship information K03 that parent document B02 is related to child document ID B04. In other words, parent document B02 is related to two child documents B03 and B04. Thus, by storing document data and the relationship between the document data in different databases, relationship between the document data can be set in an unhindered manner.

The operating unit 101 is an input device, such as a keyboard and/or a mouse, that accepts various instructions from a user. These instructions include a display document list instruction for displaying document list, specification of a piece of document data for which a related documents list is to be created, and a display related document list instruction for displaying the list of related documents. The operating unit 101 also accepts instructions from the user such as specification of a piece of document data from the displayed related document list for printing, a print instruction for printing the specified piece of document data, as well as a select display format instruction for selecting a display format for the list of related documents. The operating unit 101 also accepts a set relationship instruction for setting a parent-child relationship between pieces of document data.

The UI control unit 103 controls the operating unit 101, the display unit 102, and the printing unit 109. When the operating unit 101 receives a set relationship instruction for setting a parent-child relationship between pieces of document data, the UI control unit 103 stores in the relationship information database 120 the document IDs corresponding to the concerned document data.

When the operating unit 101 receives a display document list instruction, the document-list creating unit 104 retrieves the document IDs and the document data from the document database 110, and creates a document list data for displaying the document IDs and the document data on the display unit 102.

When the operating unit 101 receives specification of a piece of document data for which related document list is to be created and a display related document list instruction, the relationship-information searching unit 105 searches the relationship information database 120 for the relationship information pertaining to the document ID corresponding to the specified piece of document data.

To search for the relationship information pertaining to a desired document ID, the relationship-information searching unit 105 searches the relationship information database 120 for the relationship information which includes the document ID of interest in the fields 'Parent document ID' or 'Child document ID', and recursively searches for the relationship information that includes the child document ID or the parent document ID corresponding to the parent document ID or the child document ID found in the first round of search. Thus, all the available relationship information pertaining to the originally specified document ID is searched without missing any.

The related-document-list creating unit 106 creates a list of related documents based on the relationship information retrieved by the relationship-information searching unit 105. The list is a hierarchical representation of document data indicating a super-sub relationship between the pieces of document data. The list can have any data structure as long as it indicates the super-sub relationship between the pieces of document data. For example, one document data can be data containing a combination of a super-level pointer number, one or a plurality of super-level pointers, a document ID, a sub-level pointer number, and one or a plurality of sub-level pointers. If the super-level pointer number is 0, it indicates that the document is of highest level, and if the sub-level pointer number is 0, it indicates that the document is of lowest level. A plurality of super-level pointers can be stored for one document data, thus indicating the presence of a plurality of parent document data related to the concerned document data. Similarly, a plurality of sub-level pointers can be stored for one document data, thus indicating the presence of a plurality of child document data related to the concerned document data.

The display unit 102 is a display device that displays the document list created by the document-list creating unit 104 or the related document list created by the related-document-list creating unit 106. What is to be displayed on the display unit 102 is determined according to an instruction received from the user via the operating unit 101.

The related-document-list writing unit 107 stores the list data of related documents created by the related-document-list creating unit 106 in the related-document-list storage unit 108. The related-document-list storage unit 108 stores therein the list data of related documents.

The printing unit 109 is a printer device and prints the document data for which a print instruction is received by the operating unit 101. Although the printing unit 109 is shown inside the PC 100, it can be a separate entity from the PC 100.

Figure 4:
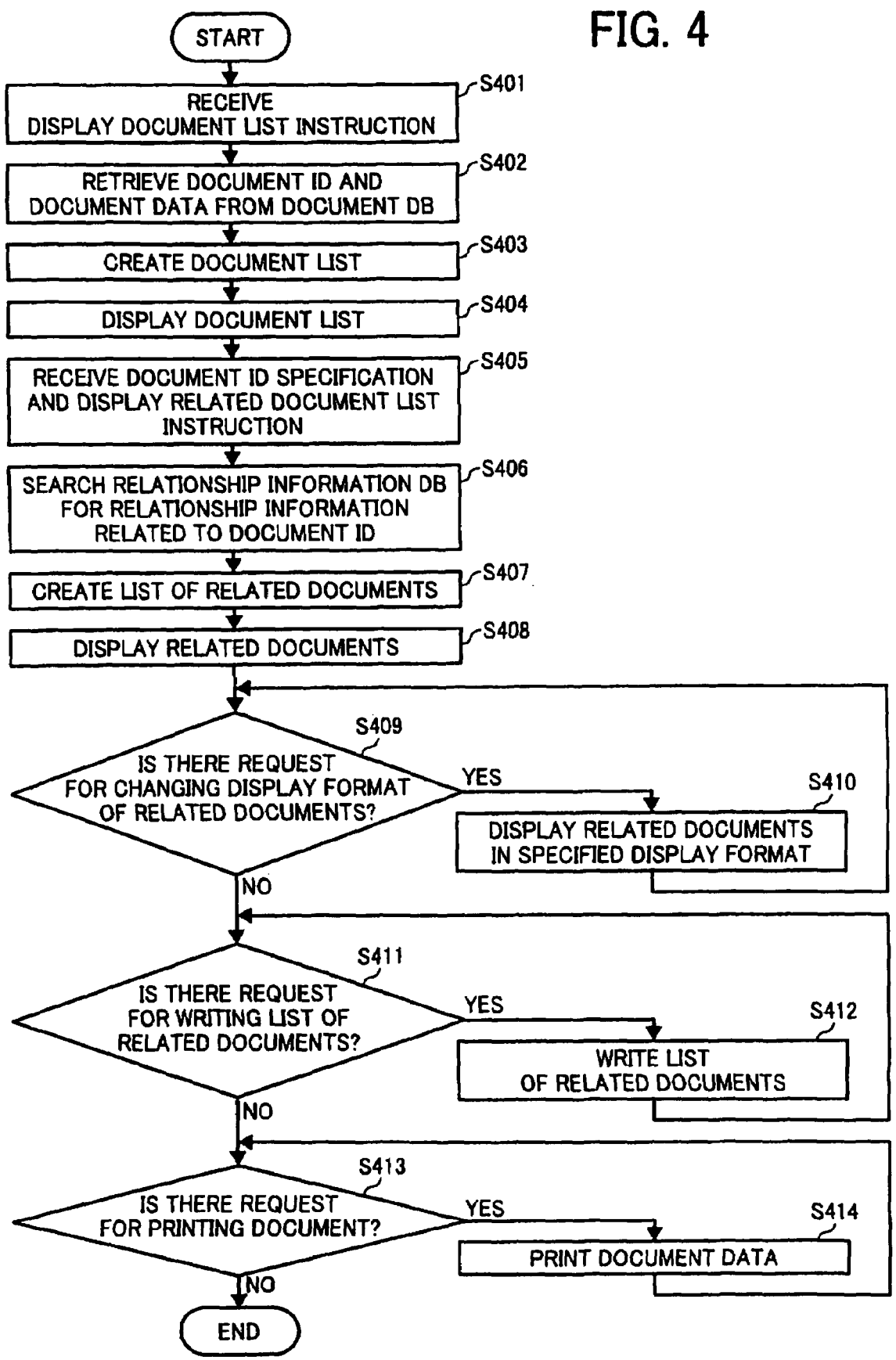
FIG. 4 is a flowchart of a document list/related document list display process performed sequentially by a UI control unit, a document-list creating unit, a relation-information searching unit, a related-document-list creating unit, a related-document-list writing unit, and a printing unit shown in FIG. 1.

A document list/related document list display process performed by the PC 100 is explained below. FIG. 4 is a flowchart of the document list/related document list display process performed sequentially by the UI control unit 103, the document-list creating unit 104, the relationship-information searching unit 105, the related-document-list creating unit 106, the related-document-list writing unit 107, and the printing unit 109.

The UI control unit 103 receives a display document list instruction from a user via the operating unit 101 (Step S401). The document-list creating unit 104 retrieves the document ID and the document data from the document database 110 (Step S402), and creates the document list data (Step S403). The document list data created by the document-list creating unit 104 can, for example, be in the form of thumbnail images of the document data retrieved from the document database 110.

Figures 5, 6:
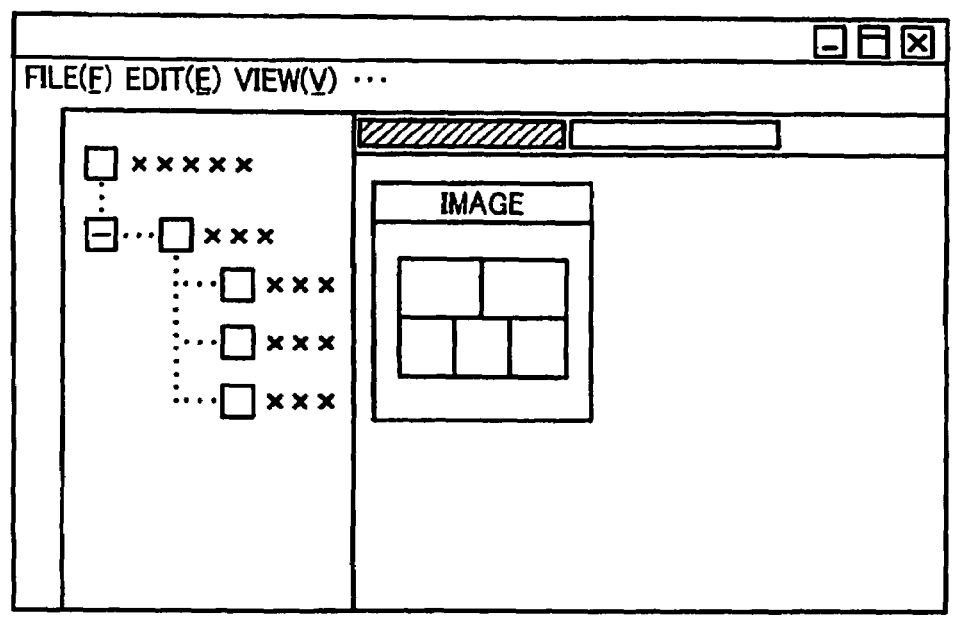
FIG. 5 is an example of the contents of a document list displayed on a display unit shown in FIG. 1.
FIG. 6 is an example of the contents of a related document list displayed on the display unit.

The UI control unit 103 determines in which manner the display unit 102 is to display the document list (Step S404). FIG. 5 is an example of the contents of the document list displayed on the display unit 102. If the pieces of document data are managed as folders, the UI control unit 103 can be configured to control the display unit 102 to display thumbnail images of the document data included in the specified folder. Alternatively, the display unit 102 can be controlled to display the document names instead of the thumbnail images, or both the thumbnail images and the document names.

The UI control unit 103 receives from the user via the operating unit 101 specification of a document ID and a display related document list instruction (Step S405). Specifically, when the user selects an document data of interest from among of the document data displayed on the display unit 102, the UI control unit 103 receives a document ID corresponding to the document data selected by the user from the display unit 102. The relationship-information searching unit 105 retrieves the relationship information corresponding to the document ID from the relationship information database 120 (Step S406). Specifically, the relationship-information searching unit 105 searches the relationship information database 120 for the relationship information that includes the document ID of interest in the fields 'Parent document ID' or 'Child document ID', and recursively searches for the relationship information that includes the child document ID or the parent document ID corresponding to the parent document ID or the child document ID found in the first round of search. Thus, the relationship-information searching unit 105 retrieves the document IDs related to the document ID of interest along with their parent-child relationship.

If the volume of relationship information in the relationship information database 120 is significantly large because of which search time is anticipated to be prolonged, an upper limit can be set for the search. For example, an upper limit can be set for the number of pieces of relationship information to be searched or the number of generations of relationship information from the document ID of interest (for example, up to three parent generations from the document data of interest, or up to three child generations from the document data of interest).

The related-document-list creating unit 106 creates a list of related documents based on the retrieved relationship information (Step S407). Specifically, the related-document-list creating unit 106 retrieves the document IDs related to the document ID of interest, and creates the list of related documents indicating each document ID's super-sub relationship with the document ID of interest.

The UI control unit 103 displays the related documents (Step S408). Specifically, the UI control unit 103 extracts only the document IDs from the list of related documents, and prepares and displays a list of the document names and details included in the document data corresponding to the extracted document IDs. FIG. 6 is an example of the contents of the related document list displayed on the display unit 102. The related document list, as shown in FIG. 6, is a list of the document names and the details of all the pieces of document data related to the document data of interest.

The UI control unit 103 determines whether there is a request for changing the display format of the related documents (Step S409). Specifically, the UI control unit 103 determines whether the operating unit 101 received a change display format instruction from the user. If there is no request for changing the display format of the related documents (No at Step S409), the system control proceeds to Step S411.

Figure 7:
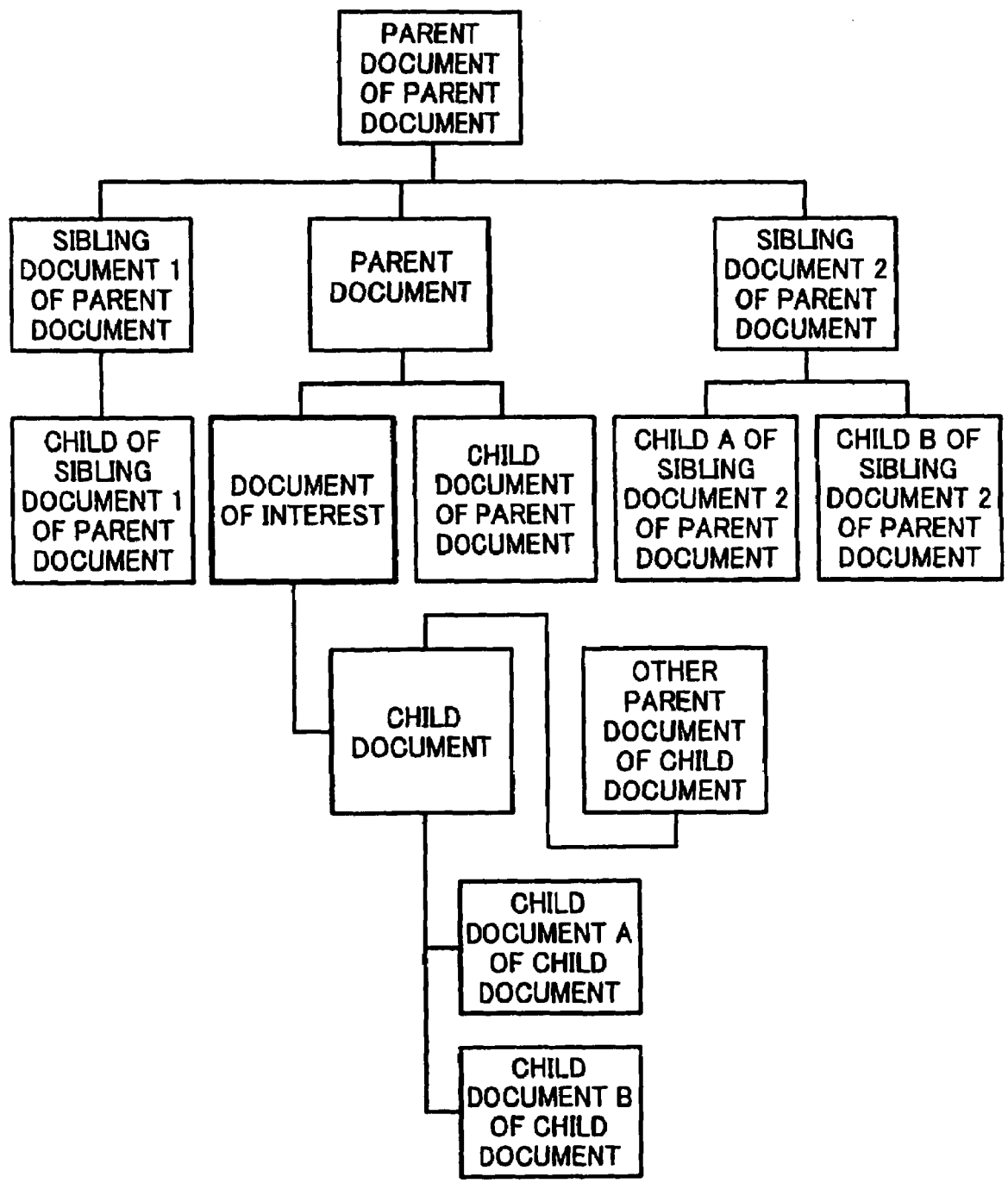
FIG. 7 is another example of the contents of the related document list displayed on the display unit.

If there is a request for changing the display format of the related documents (Yes at Step S409), the UI control unit 103 displays the related documents from the list of related documents in the display format specified by the user (Step S410). Specifically, the UI control unit 103 creates a display data of the related documents in such a way that their parent-child relationship with the document ID of interest is visually recognizable. FIG. 7 is another example of the contents of the related document list displayed on the display unit 102. In FIG. 7, the parent-child relationships between the pieces of document data related to the document data of interest are displayed on a single screen. The pieces of document data are denoted by their relationship with the document data of interest in FIG. 7 to enable easy identification of the relationship between the pieces of document data. However, in actuality, the document names and thumbnail images are displayed.

The UI control unit 103 determines whether there is a write request for the list of related documents (Step S411). Specifically, the UI control unit 103 determines whether the operating unit 101 has received a write related document list instruction from the user. If there is no request for writing the list of related documents (No at Step S411), the system control proceeds to Step S413.

If there is a request for writing the list of related documents (Yes at Step S411), the related-document-list writing unit 107 writes the currently displayed list of related documents to a file (Step S412), and stores the file in the related-document-list storage unit 108. Storing the list of related documents created by the related-document-list creating unit 106 in the related-document-list storage unit 108 allows the related document list to be instantly displayed on the display unit 102 without first having to create the list of related documents whenever there is a display related document list instruction.

The UI control unit 103 determines whether there is a request for printing the document (Step S413). Specifically, the UI control unit 103 determines whether the operating unit 101 has received specification of the piece of document data for printing and a print instruction from the user. If there is no request for printing a document (No at Step S413), the process is ended. If there is a request for printing a document (Yes at Step S413), the document data that is specified by the user is printed with the printing unit 109 (Step S414).

Thus, according to the first embodiment, all the pieces of document data hierarchically related to the document data of interest are displayed on a single screen, enabling easy checking of how many relevant documents are present without missing any relevant document. Displaying the hierarchical structure of the pieces of document data on a single screen enables users to readily grasp the connection between documents.

For example, parent-child relationship can be specified between related documents such as quotation, purchase order, and invoice, so that all the quotations, purchase orders, and invoices are displayed on a single screen, enabling thorough checking.

Even in the cases where paper documents are converted to electronic documents, relationship between different pieces of document data can be easily understood, enabling easy management of document data.

Figure 8:
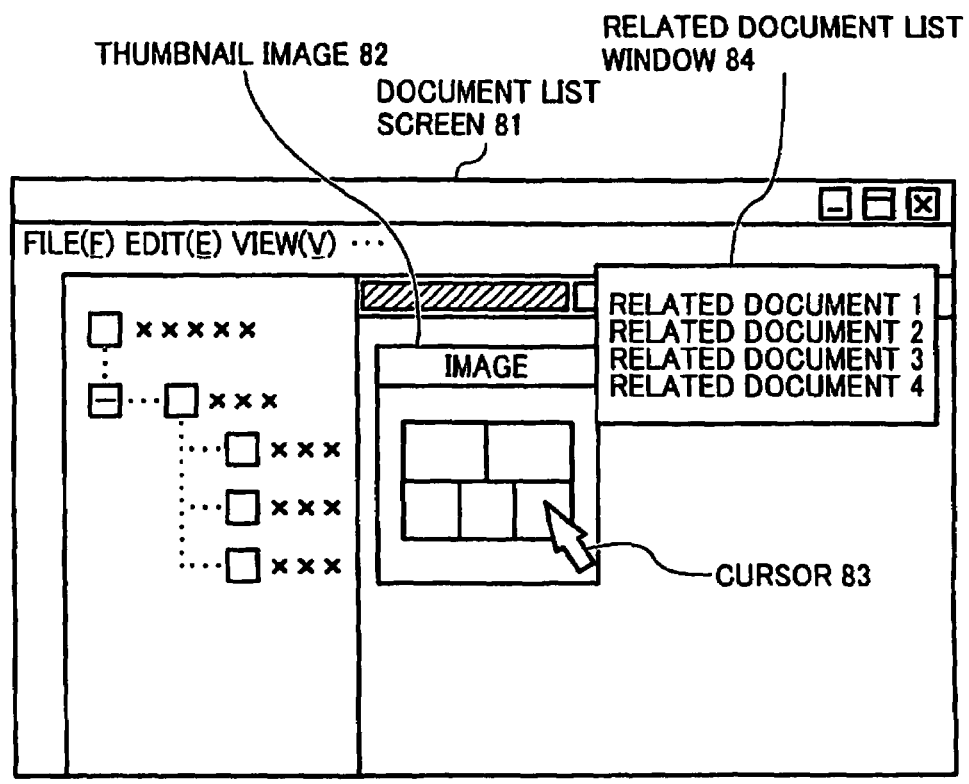
FIG. 8 is yet another example of the contents of the related document list displayed on the display unit.

As an alternative display format, the related document list can be displayed as a popup screen upon placing a cursor 83 on a thumbnail image or document name displayed on the display unit 102. FIG. 8 is yet another example of the contents of the related document list displayed on the display unit 102.

For realizing the display format described above, a position judging unit, not shown in FIG. 1, determines whether the cursor 83 is placed on a thumbnail image 82 of a piece of document data displayed on a document list screen 81. If the cursor 83 is determined to be placed on the thumbnail image 82, the relationship-information searching unit 105 searches for the relationship information corresponding to the document ID of the document data displayed at the cursor 83 position. The related-document-list creating unit 106 creates the list. The display unit 102 displays a related-document list screen 84 as a popup screen (similar to tool hint display). Alternatively, the related-document list screen 84 can be displayed taking the cursor 83 to the thumbnail image 82 and clicking or double-clicking it.

Figure 9:
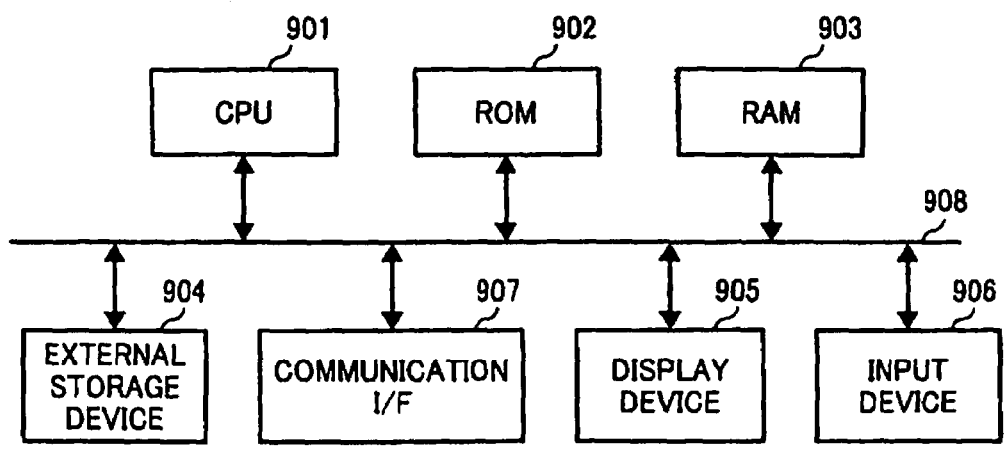
FIG. 9 is a hardware configuration of the PC shown in FIG. 1.

FIG. 9 is an exemplary hardware configuration of the PC 100. The PC 100 has a hardware configuration of a regular computer, and includes a control device in the form of a central processing unit (CPU) 901, storage devices in the form of a read-only memory (ROM) 902 and a random access memory (RAM) 903, external storage devices 904 in the form of a hard disk drive (HDD) and a compact disk (CD) drive, a display device 905 in the form of a display monitor, input devices 906 in the form of a keyboard and a mouse, a communication interface (I/F) 907 for communicating with external devices, and a bus 908 that interconnects all the devices mentioned above.

A document management program executed by the PC 100 is in the form of an installable or executable file stored on a computer-readable recording medium such as a CD-ROM, flexible disk (FD), CD-recordable (CD-R), and digital versatile disk (DVD).

The document management program executed by the PC 100 can also be downloaded over a network, such as the Internet, from a computer connected to the network. The document management program can be configured to be made available and be distributed over the Internet.

Alternatively, the document management program can be incorporated into the ROM.

The document management program includes various modules (a UI control module, a document-list creating module, a relation-information searching module, a related-document-list creating module, and a related-document-list writing module). When the CPU (processor) reads the document management program from the recording medium, the modules are loaded to a main memory, and the UI control unit, the document-list creating unit, the relationship-information searching unit, the related-document-list creating unit, and the related-document-list writing unit are formed in the main memory.

The document database 110 and the relationship information database 120 can be stored in a typical storage medium such as the HDD, optical disk, and memory card.

A document management system 10 according to a second embodiment of the present invention is explained below with reference to the accompanying drawings. Explanation of parts that are common with the first embodiment has been omitted.

Figure 10:
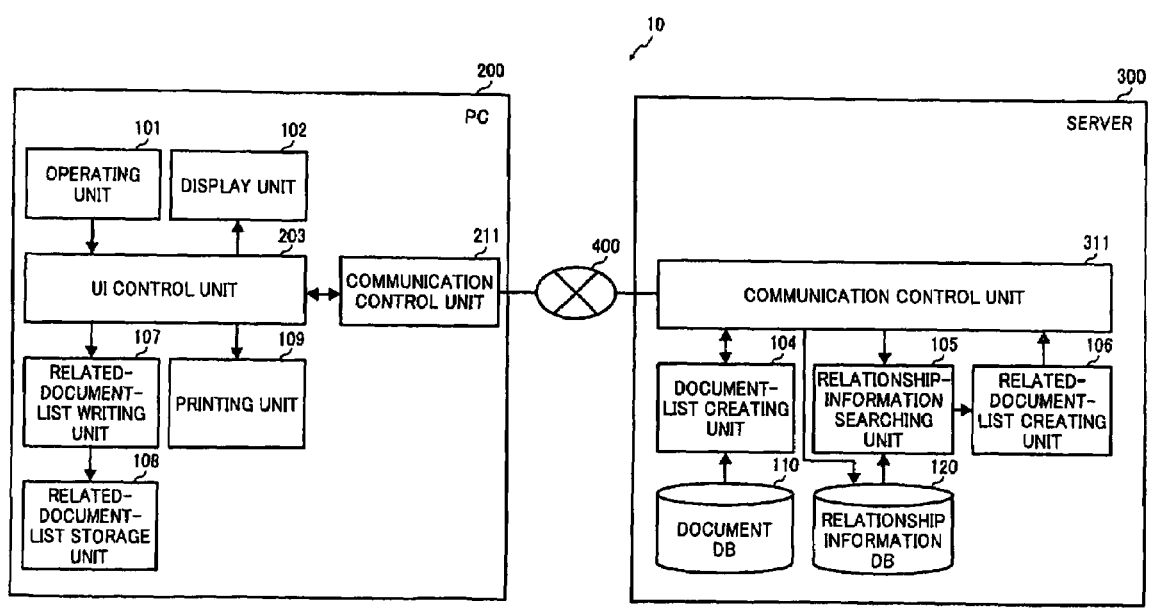
FIG. 10 is a block diagram of a document management system according to a second embodiment of the present invention.

FIG. 10 is a block diagram of the document management system 10. The document management system 10 includes a PC 200 and a server 300. The PC 200 and the server 300 are connected via a network 400.

The PC 200 includes the operating unit 101, the display unit 102, a UI control unit 203, the related-document-list writing unit 107, the related-document-list storage unit 108, the printing unit 109, and a communication control unit 211. The operating unit 101, the display unit 102, the related-document-list writing unit 107, the related-document-list storage unit 108, and the printing unit 109 are structurally and functionally identical to those described in the first embodiment with reference to FIG. 1.

The UI control unit 203 is structurally identical to the UI control unit 103 and performs all the functions of the UI control unit 103, and in addition, issues instructions to the server 300 through the communication control unit 211 to create document list, and list of document IDs and related documents.

The communication control unit 211 facilitates data exchange between the PC 200 and the server 300 over the network 400.

The server 300 includes the document-list creating unit 104, the relationship-information searching unit 105, the related-document-list creating unit 106, a communication control unit 311, the document database 110, and the relationship information database 120. The document-list creating unit 104, the relationship-information searching unit 105, the related-document-list creating unit 106, the document database 110, and the relationship information database 120 are structurally and functionally identical to those described in the first embodiment.

The communication control unit 311 facilitates data exchange between the server 300 and the PC 200 over the network 400. The communication control unit 311 also controls the document-list creating unit 104 and the relationship-information searching unit 105 according to the instruction issued by the PC 200, to create a document list or a list of document IDs and related documents.

Figure 11A:
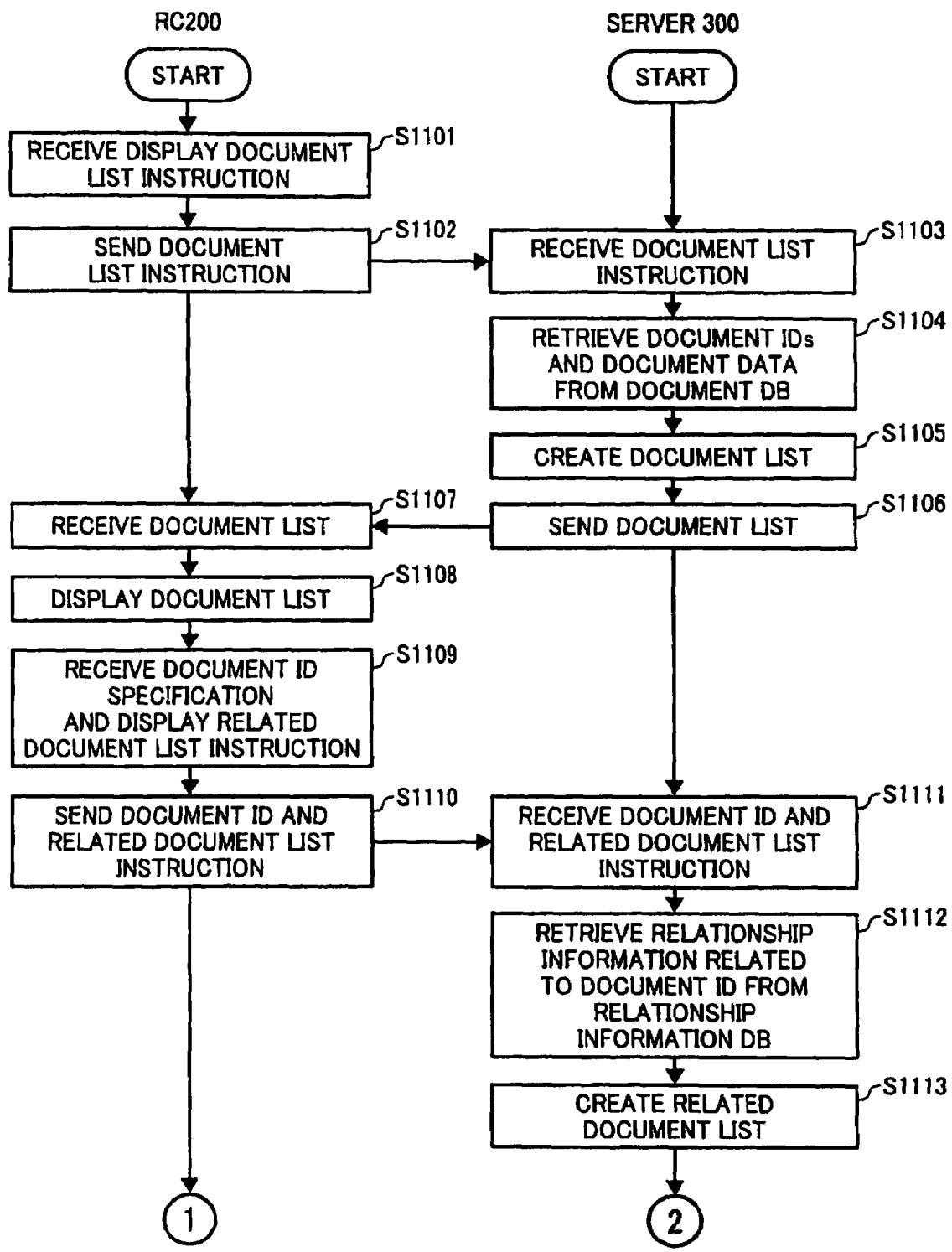
FIGS. 11A and 11B are two parts of a flowchart of the document list/related document list display process performed sequentially by a UI control unit, communication control units, the document-list creating unit, the relationship-information searching unit, the related-document-list creating unit, the related-document list writing unit, and the printing unit shown in FIG. 10.
Figure 11B:
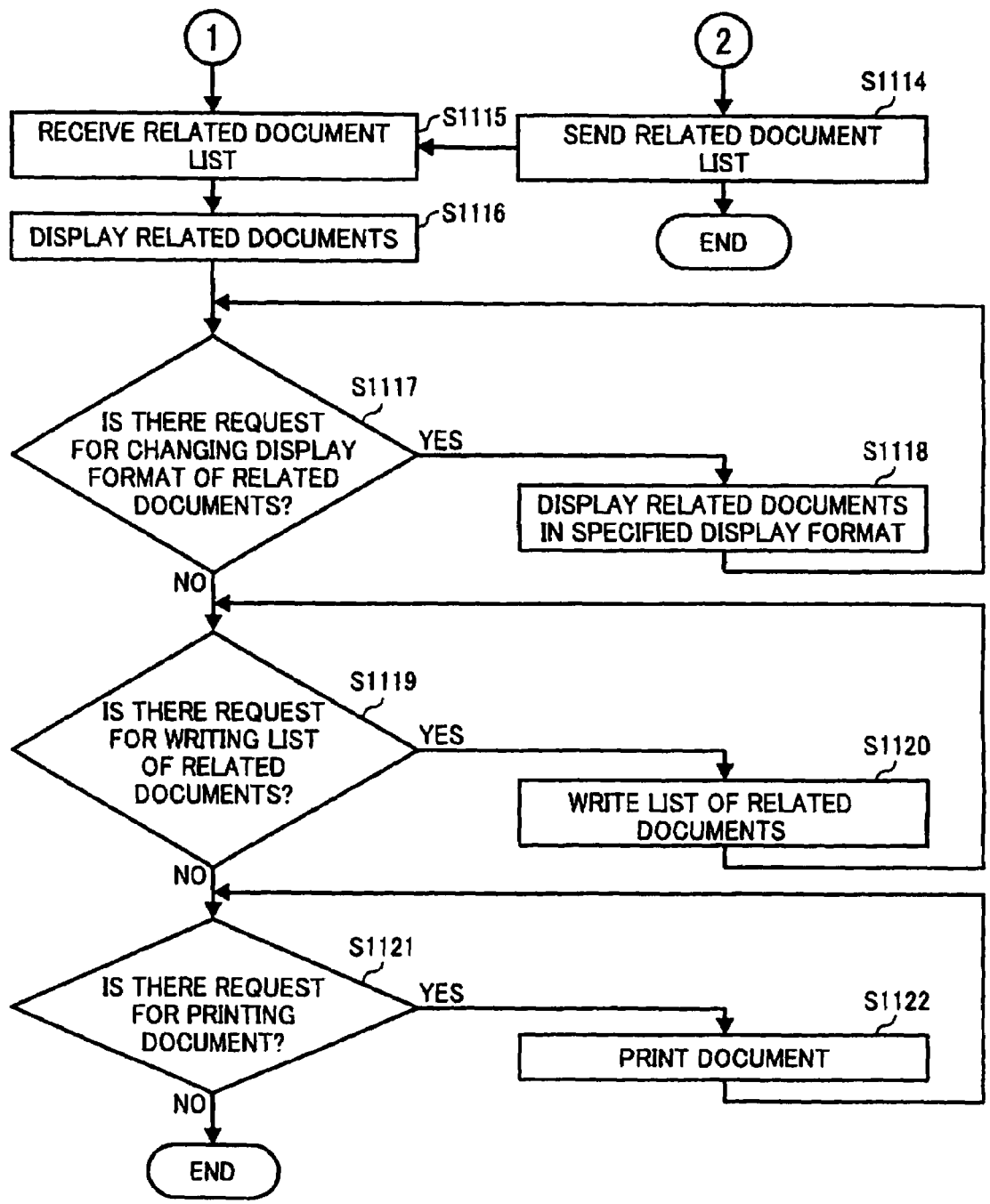

A document list/related document list display process performed by the document management system 10 is explained next. FIGS. 11A and 11B are two parts of a flowchart of the document list/related document list display process performed by the UI control unit 203, the communication control units 211 and 311, the document-list creating unit 104, the relationship-information searching unit 105, the related-document-list creating unit 106, the related-document-list writing unit 107, and the printing unit 109 of the document management system 10. Please refer to the document list/ related document list display process according to the first embodiment for process details.

The UI control unit 103 of the PC 200 receives a display document list instruction from a user via the operating unit 101 (Step S1101). The communication control unit 211 sends the display document list instruction to the server 300 (Step S1102).

The communication control unit 311 of the server 300 receives the display document list instruction from the PC 200 (Step S1103). The document-list creating unit 104 retrieves document IDs and document data from the document database 110 (Step S1104) and creates a document list (Step S1105). The communication control unit 311 sends the document list to the PC 200 (Step S1106).

The communication control unit 211 of the PC 200 receives the document list (Step S1107). The UI control unit 103 displays the document list on the display unit 102 (Step S1108). The UI control unit 103 receives specification of the document ID and a display related document list instruction from a user (Step S1109). The communication control unit 211 sends the document ID and the display related document list instruction received from the user to the server 300 (Step S1110).

The communication control unit 311 of the server 300 receives the document ID and the display related document list instruction from the PC 200 (Step S1111). The relationship-information searching unit 105 retrieves from the relationship information database 120 the relationship information corresponding to the document ID (Step S1112). The related-document-list creating unit 106 creates a list of related documents from the retrieved relationship information (Step S1113). The communication control unit 311 sends the list of related documents to the PC 200 (Step S1114, see FIG. 11B).

The communication control unit 211 of the PC 200 receives the list of related documents from the server 300 (Step S1115). The UI control unit 103 displays the related documents on the display unit 102 (Step S1116). The UI control unit 103 determines whether there is a request for changing the display format of the related documents from the user (Step S1117). If there is no request for changing the display format (No at Step S1117), the system control proceeds to Step S1119.

If there is a request for changing the display format (Yes at Step S1117), the UI control unit 103 displays the related documents from the list of related documents in the format specified by the user (Step S1118). The UI control unit 103 determines whether there is a request for writing the list of related documents (Step S1119). If there is no request for writing (No at Step S1119), the system process proceeds to Step S1121.

If there is a request for writing the document from the user (Yes at Step S1119), the related-document-list writing unit 107 writes the currently displayed list of related documents to a file (Step S1120), and stores the file in the related-document-list storage unit 108. Storing the list of related documents created by the related-document-list creating unit 106 in the related-document-list storage unit 108 allows the related document list to be instantly displayed on the display unit 102 without first having to create the list of related documents whenever there a display related document list instruction.

The UI control unit 103 determines whether there is a request for printing the document from the user (Step S1121). If the volume of related document data is significantly large, the document data to be printed can be sent for printing from the server 300 to the PC 200 at the time of print request. If there is no request for printing the document (No at Step S1121), the process is ended. If there is a request for printing the document (Yes at Step S1121), the document data specified by the user is printed with the printing unit 109 (Step S1122).

Thus, in the second embodiment, the server 300 includes the document database 110 and the relationship information database 120 and performs document management by creating the list of related documents when there is an instruction from the PC 200. As a result, the process load on the PC 200 is reduced.

Variations of the embodiments disclosed could be made. The structures and the functions of the first and the second embodiments can be inter-combined as required.

According to an embodiment of the present invention, relationship between a plurality of pieces of document data can be displayed for easy understanding of a user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A document management device comprising:
   a document storage unit configured to store therein pieces of document data;
   a relationship-information storage unit configured to store therein relationship information indicating a parent-child relationship between the pieces of document data stored in the document storage unit;
   a document selecting unit configured to select a piece of document data from among the pieces of document data stored in the document storage unit as a selected piece of document data;
   a searching unit configured to search for related-document information that is relationship information pertaining to the selected piece of document data, wherein the searching unit is configured to stop searching when an upper limit for the relationship information is reached; and
   a creating unit configured to create from the related-document information retrieved by the searching unit a list that indicates a hierarchical relationship between the selected piece of document data and other pieces of document data stored in the document storage unit.

2. The document management device according to claim 1, wherein the document storage unit is configured to store therein an association of a piece of a document data and a document ID that identifies the piece of document data for all the pieces of the document data,
   the relationship-information storage unit is configured to store therein, as the relationship information, an association of a parent document ID that forms a super-level document ID of the parent-child relationship and a child document ID that forms a sub-level document ID of the parent-child relationship, and
   the searching unit is configured to perform a first round of search by searching the relationship information for information that includes the document ID of the selected piece of document data as the parent document ID or the child document ID, and recursively search the relationship information for additional information that includes the child document ID or the parent document ID corresponding to the parent document ID or the child document ID found in the first round of search.

3. The document management device according to claim 2, further comprising a related document display unit configured to display the pieces of document data that are related to the selected piece of document data on a single screen based on the list, wherein the related-document display unit is configured to display a super-sub relationship between two pieces of document data.

4. The document management device according to claim 1, further comprising:
- a document-list display unit configured to display the pieces of document data stored in the document storage unit; and
- a position-determining unit configured to determine whether a cursor is placed on a piece of document data displayed on the document-list display unit.

5. The document management device according to claim 1, wherein the document data includes a document name that indicates a name of the document data.

6. The document management device according to claim 1, further comprising a list storing unit configured to store therein the list.

7. The document management device according to claim 1, wherein the document selecting unit is configured to select a piece of document data as print data from among the pieces of document data,
- the document management device further comprising a printing unit configured to print the piece of document data being the print data selected by the document selecting unit.

8. The document management device according to claim 1, further comprising a related-document display unit configured to display the pieces of document data that are related to the selected piece of document data on a single screen based on the list.

9. The document management device according to claim 8, further comprising:
- a document-list display unit configured to display the pieces of document data stored in the document storage unit; and
- a position-determining unit configured to determine whether a cursor is placed on a piece of document data displayed on the document-list display unit,
- wherein, when the position-determining unit determines that the cursor is placed on a piece of document data, the related-document display unit is configured to display the document data related to the piece of document data on which the cursor is placed.

10. The document management device according to claim 8, wherein the document data includes a document name that indicates a name of the document data, and
- the related-document display unit is configured to display as the document data the document name included in the document data.

11. The document management device according to claim 8 wherein the document selecting unit is configured to select a piece of document data as print data from among the pieces of document data displayed by the related document display unit,
- the document management device further comprising a printing unit configured to print the piece of document data being the print data selected by the document selecting unit.

12. A document management method comprising:
- storing, in a document storage unit, pieces of document data;
- storing, in a relationship-information storage unit, relationship information indicating a parent-child relationship between the pieces of document data stored in the document storage unit;
- selecting a piece of document data from among the pieces of document data stored in the document storage unit as a selected piece of document data;
- searching for related-document information that is relationship information pertaining to the selected piece of document data;
- stopping the searching when an upper limit for the relationship information is reached; and
- creating, from the related-document information retrieved at the searching, a list that indicates a hierarchical relationship between the selected piece of document data and other pieces of document data stored in the document storage unit.

13. The document management method according to claim 12, further comprising displaying the pieces of document data that are related to the selected piece of document data on a single screen based on the list.

14. A computer program product including a non-transitory computer-readable medium having stored thereon a document management program that implements a document management method, the document management method comprising:
- storing, in a document storage unit, pieces of document data;
- storing, in a relationship-information storage unit, relationship information indicating a parent-child relationship between the pieces of document data stored in the document storage unit;
- selecting a piece of document data from among the pieces of document data stored in the document storage unit as a selected piece of document data;
- searching for related-document information that is relationship information pertaining to the selected piece of document data;
- stopping the searching when an upper limit for the relationship information is reached; and
- creating, from the related-document information retrieved at the searching, a list that indicates a hierarchical relationship between the selected piece of document data and other pieces of document data stored in the document storage unit.

15. The computer program product according to claim 14, wherein the document management method further comprises displaying the pieces of document data that are related to the selected piece of document data on a single screen based on the list.

* * * * *